(12) United States Patent
Kutliroff et al.

(10) Patent No.: US 9,910,498 B2
(45) Date of Patent: Mar. 6, 2018

(54) SYSTEM AND METHOD FOR CLOSE-RANGE MOVEMENT TRACKING

(75) Inventors: Gershom Kutliroff, Alon Shvut (IL); Yaron Yanai, Modiin (IL); Amit Bleiweiss, Yad Binyamin (IL); Shahar Fleishman, Hod Hasharon (IL); Yotam Livny, Gedera (IL); Jonathan Epstein, San Francisco, CA (US)

(73) Assignee: INTEL CORPORATION, Santa Clara, CA (US)

( * ) Notice: Subject to any disclaimer, the term of this patent is extended or adjusted under 35 U.S.C. 154(b) by 186 days.

(21) Appl. No.: 13/532,609

(22) Filed: Jun. 25, 2012

(65) Prior Publication Data

US 2012/0327125 A1    Dec. 27, 2012

Related U.S. Application Data

(60) Provisional application No. 61/500,480, filed on Jun. 23, 2011.

(51) Int. Cl.
| | | |
|---|---|---|
| *G06F 3/01* | (2006.01) | |
| *G06T 19/00* | (2011.01) | |
| *G06F 3/0481* | (2013.01) | |
| *G06F 3/0484* | (2013.01) | |
| *G06F 3/03* | (2006.01) | |

(52) U.S. Cl.
CPC ............ *G06F 3/017* (2013.01); *G06F 3/011* (2013.01); *G06F 3/0304* (2013.01); *G06F 3/04815* (2013.01); *G06F 3/04842* (2013.01); *G06T 19/006* (2013.01)

(58) Field of Classification Search
None
See application file for complete search history.

(56) References Cited

U.S. PATENT DOCUMENTS

| | | |
|---|---|---|
| 4,900,033 A | 2/1990 | Campos et al. |
| 5,534,917 A | 7/1996 | MacDougall |
| 5,994,844 A | 11/1999 | Crawford et al. |
| 6,072,494 A | 6/2000 | Nguyen |
| 6,104,379 A | 8/2000 | Petrich et al. |

(Continued)

FOREIGN PATENT DOCUMENTS

| | | |
|---|---|---|
| CN | 1656503 A | 8/2005 |
| CN | 101305401 A | 11/2008 |

(Continued)

OTHER PUBLICATIONS

Du et al., "A Virtual Keyboard System Based on Multi-Level Feature Matching," HSI, 2008.*

(Continued)

*Primary Examiner* — Nicholas R Wilson
(74) *Attorney, Agent, or Firm* — Womble Bond Dickinson (US) LLP

(57) ABSTRACT

A system and method for close range object tracking are described. Close range depth images of a user's hands and fingers or other objects are acquired using a depth sensor. Using depth image data obtained from the depth sensor, movements of the user's hands and fingers or other objects are identified and tracked, thus permitting the user to interact with an object displayed on a screen, by using the positions and movements of his hands and fingers or other objects.

17 Claims, 5 Drawing Sheets

(56) References Cited

U.S. PATENT DOCUMENTS

| | | | |
|---|---|---|---|
| 6,181,343 B1 | 1/2001 | Lyons | |
| 6,256,033 B1 | 7/2001 | Nguyen | |
| 6,270,414 B2 | 8/2001 | Roelofs | |
| 6,336,891 B1 | 1/2002 | Fedrigon et al. | |
| 6,632,158 B1 | 10/2003 | Nashner | |
| 6,750,890 B1 | 6/2004 | Sugimoto | |
| 6,788,809 B1 | 9/2004 | Grzeszczuk et al. | |
| 6,941,239 B2 | 9/2005 | Unuma et al. | |
| 7,027,083 B2 | 4/2006 | Kanade et al. | |
| 7,038,855 B2 | 5/2006 | French et al. | |
| 7,225,414 B1* | 5/2007 | Sharma et al. | 715/863 |
| 7,340,077 B2 | 3/2008 | Gokturk et al. | |
| 7,369,685 B2 | 5/2008 | DeLean | |
| 7,372,977 B2 | 5/2008 | Fujimura et al. | |
| 7,379,563 B2 | 5/2008 | Shamaie | |
| 7,421,369 B2 | 9/2008 | Clarkson | |
| 7,538,744 B1 | 5/2009 | Liu et al. | |
| 7,665,041 B2 | 2/2010 | Wilson et al. | |
| 7,725,547 B2 | 5/2010 | Albertson et al. | |
| 7,753,861 B1 | 7/2010 | Kahn et al. | |
| 7,781,666 B2 | 8/2010 | Nishitani et al. | |
| 7,789,800 B1 | 9/2010 | Watterson et al. | |
| 7,815,507 B2 | 10/2010 | Parrott et al. | |
| 7,840,031 B2 | 11/2010 | Albertson et al. | |
| 7,843,425 B2 | 11/2010 | Lu et al. | |
| 7,849,421 B2 | 12/2010 | Yoo et al. | |
| 7,970,176 B2 | 6/2011 | Kutliroff et al. | |
| 7,971,156 B2 | 6/2011 | Albertson et al. | |
| 8,094,928 B2 | 1/2012 | Graepel et al. | |
| 8,113,991 B2 | 2/2012 | Kutliroff | |
| 8,228,315 B1 | 7/2012 | Starner | |
| 8,319,865 B2 | 11/2012 | Lee et al. | |
| 8,686,943 B1 | 4/2014 | Rafii | |
| 2001/0016510 A1 | 8/2001 | Ishikawa et al. | |
| 2003/0078138 A1 | 4/2003 | Toyama | |
| 2003/0113018 A1 | 6/2003 | Neflan et al. | |
| 2003/0134714 A1 | 7/2003 | Oishi et al. | |
| 2003/0156756 A1 | 8/2003 | Gokturk et al. | |
| 2004/0001113 A1 | 1/2004 | Zipperer et al. | |
| 2004/0136564 A1 | 7/2004 | Roeber | |
| 2004/0190776 A1 | 9/2004 | Higaki et al. | |
| 2005/0227811 A1 | 10/2005 | Shum et al. | |
| 2005/0231532 A1 | 10/2005 | Suzuki | |
| 2005/0271279 A1* | 12/2005 | Fujimura et al. | 382/203 |
| 2006/0018516 A1 | 1/2006 | Masoud et al. | |
| 2006/0202953 A1 | 9/2006 | Pryor et al. | |
| 2006/0215011 A1 | 9/2006 | P.S. et al. | |
| 2007/0110298 A1 | 5/2007 | Graepel et al. | |
| 2007/0298883 A1 | 12/2007 | Feldman et al. | |
| 2008/0122786 A1* | 5/2008 | Pryor et al. | 345/156 |
| 2008/0139307 A1 | 6/2008 | Ueshima et al. | |
| 2008/0152191 A1 | 6/2008 | Fujimura et al. | |
| 2008/0161997 A1 | 7/2008 | Wengelnik et al. | |
| 2008/0192005 A1 | 8/2008 | Elgoyhen et al. | |
| 2008/0225041 A1 | 9/2008 | El Dokor et al. | |
| 2008/0244465 A1 | 10/2008 | Kongqiao et al. | |
| 2008/0258921 A1 | 10/2008 | Woo et al. | |
| 2009/0015681 A1 | 1/2009 | Pipkorn | |
| 2009/0023555 A1 | 1/2009 | Raymond | |
| 2009/0048070 A1 | 2/2009 | Vincent et al. | |
| 2009/0055205 A1 | 2/2009 | Nguyen et al. | |
| 2009/0077504 A1 | 3/2009 | Bell et al. | |
| 2009/0085864 A1 | 4/2009 | Kutliroff et al. | |
| 2009/0103780 A1 | 4/2009 | Nishihara et al. | |
| 2009/0109795 A1 | 4/2009 | Marti | |
| 2009/0113389 A1 | 4/2009 | Ergo et al. | |
| 2009/0175540 A1 | 7/2009 | Dariush et al. | |
| 2009/0232353 A1 | 9/2009 | Sundaresan et al. | |
| 2009/0234614 A1 | 9/2009 | Kahn et al. | |
| 2009/0262986 A1 | 10/2009 | Cartey et al. | |
| 2009/0271821 A1 | 10/2009 | Zalewski | |
| 2009/0298650 A1 | 12/2009 | Kutliroff | |
| 2009/0315827 A1 | 12/2009 | Elvesjo et al. | |
| 2009/0315978 A1 | 12/2009 | Wurmlin et al. | |
| 2010/0034457 A1 | 2/2010 | Berliner et al. | |
| 2010/0053151 A1 | 3/2010 | Marti et al. | |
| 2010/0060570 A1 | 3/2010 | Underkoffler et al. | |
| 2010/0066676 A1* | 3/2010 | Kramer et al. | 345/158 |
| 2010/0067181 A1 | 3/2010 | Bair et al. | |
| 2010/0092031 A1 | 4/2010 | Bergeron et al. | |
| 2010/0103093 A1 | 4/2010 | Izumi | |
| 2010/0111370 A1 | 5/2010 | Black et al. | |
| 2010/0134618 A1 | 6/2010 | Kim et al. | |
| 2010/0197400 A1* | 8/2010 | Geiss | 463/32 |
| 2010/0208038 A1 | 8/2010 | Kutliroff et al. | |
| 2010/0241998 A1* | 9/2010 | Latta et al. | 715/862 |
| 2010/0303289 A1 | 12/2010 | Polzin et al. | |
| 2010/0306699 A1 | 12/2010 | Hsu et al. | |
| 2011/0075257 A1 | 3/2011 | Hua et al. | |
| 2011/0080336 A1 | 4/2011 | Leyvand et al. | |
| 2011/0085705 A1 | 4/2011 | Izadi et al. | |
| 2011/0090407 A1 | 4/2011 | Friedman | |
| 2011/0119640 A1 | 5/2011 | Berkes et al. | |
| 2011/0134250 A1 | 6/2011 | Kim et al. | |
| 2011/0134251 A1 | 6/2011 | Kim et al. | |
| 2011/0164029 A1 | 7/2011 | King et al. | |
| 2011/0193778 A1 | 8/2011 | Lee et al. | |
| 2011/0193939 A1* | 8/2011 | Vassigh | G06F 3/011 348/46 |
| 2011/0221666 A1 | 9/2011 | Newton et al. | |
| 2011/0234481 A1 | 9/2011 | Katz et al. | |
| 2011/0249107 A1 | 10/2011 | Chiu | |
| 2011/0262002 A1 | 10/2011 | Lee | |
| 2011/0271235 A1 | 11/2011 | Doyen | |
| 2011/0304842 A1 | 12/2011 | Kao et al. | |
| 2011/0310125 A1 | 12/2011 | McEldowney et al. | |
| 2011/0317871 A1* | 12/2011 | Tossell et al. | 382/103 |
| 2012/0038739 A1 | 2/2012 | Welch et al. | |
| 2012/0038796 A1 | 2/2012 | Posa et al. | |
| 2012/0050273 A1 | 3/2012 | Yoo et al. | |
| 2012/0050483 A1 | 3/2012 | Boross et al. | |
| 2012/0062558 A1 | 3/2012 | Lee et al. | |
| 2012/0069168 A1 | 3/2012 | Huang et al. | |
| 2012/0119988 A1 | 5/2012 | Izumi | |
| 2012/0176481 A1 | 7/2012 | Lukk et al. | |
| 2012/0204133 A1 | 8/2012 | Guendelman et al. | |
| 2012/0242796 A1 | 9/2012 | Ciurea et al. | |
| 2012/0249741 A1 | 10/2012 | Maciocci et al. | |
| 2012/0257035 A1 | 10/2012 | Larsen | |
| 2012/0272179 A1 | 10/2012 | Stafford | |
| 2012/0277594 A1 | 11/2012 | Pryor | |
| 2012/0303839 A1 | 11/2012 | Jackson et al. | |
| 2012/0309532 A1 | 12/2012 | Ambrus et al. | |
| 2012/0313955 A1 | 12/2012 | Choukroun | |
| 2012/0326963 A1 | 12/2012 | Minnen | |
| 2012/0327218 A1 | 12/2012 | Baker et al. | |
| 2013/0014052 A1 | 1/2013 | Frey et al. | |
| 2013/0050425 A1 | 2/2013 | Im et al. | |
| 2013/0050426 A1 | 2/2013 | Sarmast et al. | |
| 2013/0055120 A1 | 2/2013 | Galor et al. | |
| 2013/0139079 A1 | 5/2013 | Kitao et al. | |
| 2013/0154913 A1 | 6/2013 | Genc et al. | |
| 2013/0204408 A1 | 8/2013 | Thiruvengada et al. | |
| 2013/0215027 A1 | 8/2013 | Van Lydegraf et al. | |
| 2013/0222394 A1 | 8/2013 | Fyke | |
| 2013/0249786 A1 | 9/2013 | Wang | |
| 2013/0300659 A1 | 11/2013 | Kang et al. | |
| 2013/0307771 A1 | 11/2013 | Parker et al. | |
| 2013/0307773 A1 | 11/2013 | Yagishita | |
| 2013/0336550 A1 | 12/2013 | Kapur et al. | |
| 2014/0254883 A1 | 9/2014 | Kim et al. | |

FOREIGN PATENT DOCUMENTS

| | | |
|---|---|---|
| CN | 101408800 | 4/2009 |
| CN | 101960409 | 1/2011 |
| EP | 2393298 | 12/2011 |
| EP | 2538305 | 12/2012 |
| JP | 2002-41038 | 2/2002 |
| JP | 2007-316882 A | 12/2007 |
| JP | 2007316882 A | 12/2007 |
| JP | 2010-15553 | 1/2010 |
| JP | 2010-539590 | 12/2010 |
| JP | 2011-81480 | 4/2011 |

(56) References Cited

FOREIGN PATENT DOCUMENTS

| | | |
|---|---|---|
| JP | 2012-088688 | 5/2012 |
| KR | 2005-0066400 | 6/2005 |
| KR | 2006-0070280 | 12/2007 |
| KR | 1020060070280 | 12/2007 |
| KR | 2011-0032246 | 3/2011 |
| KR | 2012-0020045 | 3/2012 |
| KR | 2012-0031805 | 4/2012 |
| KR | 2013-0018464 | 2/2013 |
| WO | WO-9919788 A1 | 4/1999 |
| WO | WO-9919788 A1 | 4/1999 |
| WO | WO-02/07839 A2 | 1/2002 |
| WO | WO-0207839 A2 | 1/2002 |
| WO | WO-05114556 A2 | 12/2005 |
| WO | WO-05114556 A2 | 12/2005 |
| WO | WO-11036618 A2 | 3/2011 |
| WO | WO-11036618 A2 | 3/2011 |

OTHER PUBLICATIONS

Charbon et al., "3D hand Model Fitting for Virtual Keyboard System," IEEE, 2007.*

Alon, J., et al., "Accurate and Efficient Gesture Spotting via Pruning and Subgesture Reasoning", Computer Vision in Human-Computer Interaction Lecture Notes in Computer Science, LNCS, Springer, Berlin, DE, pp. 189-198, Jan. 1, 2005.

Fujiki R., Arita D., and Taniguchi, R.: Real-time 3D hand shape estimation based on inverse kinematics and physical constrains. Proc ICIAP Springer LNCS 2005, Fabio Rolio and Sergio Vitulano (Eds.). 3617:850-858, 2005.

Oikonomidis, I., et al., "Efficient Model-Based 3D Tracking of Hand Articulations using Kinect", 22nd British Machine Vision Conference, pp. 1-11, Aug. 29-Sep. 2, 2011.

Pavlovic, V.I., et al., Visual Interpretation of Hand Gestures for Human-Computer Interaction: A Review, Department of Electrical and Computer Engineering, and The Beckman Institute for Advanced Science and Technology University of Illinois at Urbana-Champaign, 36 pages, Jul. 1997.

Portillo-Rodriguez, O., et al., "Development of a 3D real time gesture recognition methodology for virtual environment control", Robot and Human Interactive Communication, 2008 Ro-Man 2008, The 17th IEEE International Symposium On, IEEE, Piscataway, N.J., U.S.A, pp. 279-284, Aug. 1, 2003.

Zhu, Y., et al., "Controlled Human Pose Estimation from Dept H Image Streams" IEEE Computer Society Conference on Computer Vision and Pattern Recognition Workshops (CVPRW 08), pp. 1-8, see Abstract: Sections 2,3, and 5: figure 1, Jun. 23-28, 2008.

Co-pending U.S. Appl. No. 12/392,879 by Kutliroff, G., filed Feb. 25, 2009.

Co-pending U.S. Appl. No. 12/707,340 by Kutliroff, G., et al., filed Feb. 17, 2010.

Co-pending U.S. Appl. No. 13/785,669 by Kutliroff, G., et al., filed Mar. 5, 2013.

Restriction Requirement dated Aug. 31, 2010, in Co-pending U.S. Appl. No. 12/392,879 by Kutliroff, G., filed Feb. 25, 2009.

Non-Final Office Action dated Dec. 22, 2010, in Co-pending U.S. Appl. No. 12/392,879 by Kutliroff, G., filed Feb. 25, 2009.

Notice of Allowance dated Oct. 21, 2011, in Co-pending U.S. Appl. No. 12/392,879 by Kutliroff, G., filed Feb. 25, 2009.

Final Office Action dated Jun. 10, 2011, in Co-pending U.S. Appl. No. 12/392,879 by Kutliroff, G., filed Feb. 25, 2009.

Extended European Search Report for EP Counterpart Application No. 12173256.4, 10 pgs., (dated Jul. 31, 2013).

Stefan Soutschek et al., "3-D Gesture-Based Scene Navigation in Medical Imaging Applications Using Time-of-Flight-Cameras" pp. 6, 2008.

Martin Haker "Scale-invariant Range Features for Time-of-Flight Camera Applications" pp. 6, 2008.

Alon, J., et al., "Accurate and Efficient Gesture Spotting vie Pruning and Subgesture Reasoning", Computer Vision in Human-Computer Interaction Lecture Notes in Computer Science, LNCS, Springer, Berlin, DE, pp. 189-198, Jan. 1, 2005.

Fujiki R., Arita D., and Taniguchi, R.: Real-time 3D hand shape estimation based on inverse kinematics and physical constrains. Proc ICIAP Springer LNCS 2005, Fabio Ralio and Sergio Vitulano (Eds.). 3617:850-858, 2005.

Hansen, D., et al., "In the Eye of the Beholder: A Survey of Models for Eyes and Gaze," IEEE Transactions on Pattern Analysis and Machine Intelligence, vol. 32, Issue 3, pp. 478-500, Mar. 2010.

Keskin, C., et al., Real Time Hand Tracking and 3D Gesture Recognition for Interactive Interfaces Using HMM, Computer Engineering Dept. Bogazici University, pp. 1-4, 2003.

Lewis, J.P., et al., "Pose space deformations: A unified approach to shape interpolation and skeleton-driven deformation", Annual Conference Series, ACM SIGGRAPH, pp. 165-172, 2000.

Mackie, J., et al., "Finger Detection with Decision Trees, 2004. Proceedings of image and Vision Computing New Zealand", pp. 399-403, 2004.

Oikonomidis, I., et al., "Efficient Model-Based 3D Tracking of Hand Articulations using Kinect", $22^{nd}$ British Machine Vision Conference, pp. 1-11, Aug. 29-Sep. 2, 2011.

Pavlovis, V.I., et al., Visual Interpretation of Hand Gestures for Human-Computer Interaction: A Review, Department of Electrical and Computer Engineering, and The Beckman Institute for Advanced Science and Technology University of Illinois at Urbana-Champaign, 36 pages, Jul. 1997.

Segen, J., et al., Fast and Accurate 3D Gesture Recognition Interface, AT&T Bell Laboratories, Holmdel, NJ 07733, pp. 86-91, Aug. 16-20, 1997.

Portillo-Rodriguez, O., et al., "Development of a 3D real time gesture recognition methodology for virtual environment control", Robot and Human Interactive Communication, 2008 Ro-Man 2008, The $17^{th}$ IEEE International Symposium On, IEEE, Piscataway, N.J., U.S.A, pp. 279-284, Aug. 1, 2008.

Zhu, Y., et al., "Controlled Human Pose Estimation from Dept H Image Streams" IEEE Computer Society Conference on Computer Vision and Pattern Recognition Workshops (CVPRW 08), pp. 1-8, see Abstract: Sections 2, 3, and 5. Figure 1, Jun. 23-28, 2008.

Extended Search Report with Supplementary Search Report and Search Opinion dated Jun. 18, 2013, for European Patent Application No. EP 10744130 filed Feb. 4, 2010.

International Search Report and Written Opinion dated Sep. 16, 2010, for International Application No. PCT/US2010/023179, filed Feb. 4, 2010, 7 pages.

International Search Report and Written Opinion dated Feb. 28, 2013, for International Application No. PCT/US2012/047364, filed Jul. 19, 2012, 11 pages.

Co-pending U.S. Appl. No. 11/866,280 by Kutliroff, G., et al., filed Oct. 2, 2007.

Co-pending U.S. Appl. No. 13/310,510 by Kutliroff, G., et al., filed Dec. 2, 2011.

Co-pending U.S. Appl. No. 12/392,879 by Kutliroff, G., et al., filed Feb. 25, 2009.

Co-pending U.S. Appl. No. 12/707,340, by Kutliroff, G., et al., filed Feb. 17, 2010.

Co-pending U.S. Appl. No. 12/817,102 by Kutliroff, G., et al., filed Jun. 16, 2010.

Co-pending U.S. Appl. No. 13/441,271 by Bleiweiss, A., et al., filed Apr. 6, 2012.

Co-pending U.S. Appl. No. 13/552,978 by Yanai, Y., filed Jul. 19, 2012.

Co-pending U.S. Appl. No. 13/563,516 by Kutliroff, G., et al., filed Jul. 31, 2012.

Co-pending U.S. Appl. No. 13/652,181 by Yanai, Y., et al., filed Oct. 15, 2012.

Co-pending U.S. Appl. No. 13/676,017 by Kutliroff, G., et al., filed Nov. 13, 2012.

Co-pending U.S. Appl. No. 13/768,835 Fleischmann, S., et al., filed Feb. 15, 2013.

Co-pending U.S. Appl. No. 13/785,669 by Kutliroff, G., et el., filed Mar. 5, 2013.

Co-pending U.S. Appl. No. 13/857,009 Fleischmann, S., et al., filed Apr. 4, 2013.

(56) References Cited

OTHER PUBLICATIONS

Notice of Allowance dated Mar. 15, 2011, in Co-pending U.S. Appl. No. 11/866,280 by Kutliroff, G., et al., filed Oct. 2, 2007.
Restriction Requirement dated Aug. 31, 2010, in Co-pending U.S. Appl. No. 12/392,879 by Kutliroff, G., et al., filed Feb. 25, 2009.
Non-Final Office Action dated Dec. 22, 2010, in Co-pending U.S. Appl. No. 12/392,879 by Kutliroff, G., et al., filed Feb. 25, 2009.
Final Office Action dated Jun. 10, 2011, in Co-pending U.S. Appl. No. 12/392,879 by Kutliroff, G., et al., filed Feb. 25, 2009.
Non-Final Office Action dated Mar. 23, 2012, in Co-pending U.S. Appl. No. 12/707,340 by Kutliroff, G., et al., filed Feb. 17, 2010.
Final Office Action dated Sep. 14, 2012, in Co-pending U.S. Appl. No. 12/707,340 by Kutliroff, G., et al., filed Feb. 17, 2010.
Restriction Requirement dated Nov. 30, 2012, in Co-pending U.S. Appl. No. 12/817,102 by Kutliroff, G., et al., filed Jun. 16, 2010.
Non-Final Office Action dated Jan. 29, 2013, in Co-pending U.S. Appl. No. 12/817,102 by Kutliroff, G., et al., filed Jun. 16, 2010.
Notice of Allowance dated Jul. 29, 2013, in Co-pending U.S. Appl. No. 12/817,102 by Kutliroff, G., et al., filed Jun. 16, 2010.
Chu, Shaowei, and Jiro Tanaka, "Hand gesture for taking self portrait." Human-Computer Interaction. Interaction Techniques and Environments. Springer Berlin Heifelberg, 2011. 238-247.
Li, Zhi, and Ray Jarvis. "Real time hand gesture recognition using a range camera." Australasian Conference on Robotics and Automation. 2009.
Jenkinson, Mark. The Complete Idiot's Guide to Photography Essentials. Penguin Group, 2008, Safari Books Online. Web. Mar 4, 2014.
Raheja, Jagdish L., Ankit Chaudhary, and Kural Singal. "Tracking of fingertips and centers of palm using Kinect." Computational Intelligence, Modelling and Simulation (CIMSIM), 2011 Third International Conference on. IEEE, 2011.
"Zoom, V.". OED Online. Dec. 2013, Oxford University Press. Mar. 4, 2014.
PCT Search Report and Written Opinion, PCT/US2013/052894, 11 pages, Nov. 12, 2013.
Gil, Pablo, Jorge Pomares, and Fernando Torres. "Analysis and adaptation of integration time in PMD camera for visual serving." Pattern Recognition (ICPR), 2010 20th International Conference on. IEEE, 2010.
Ziraknejad, N.; Lawrence, P.D.; Romilly, D.P., "The effect of Time-of-Flight camera integration time on vehicle driver head pose tracking accuracy." Vehicular Electronics and Safety (ICVES), 2012 IEEE International Conference on, vol., No., pp. 247, 254, Jul. 24-27, 2012.
Murino, V.; Regazzoni, C.S.; Foresti, G.L., "Real-time adaptive regulation of a visual camera for automatic investigation of changing environments," Industrial Electronics, Control, and Instrumentation, 1993. Proceedings of the IECON '93., International Conference on, vol., No., pp. 1633, 1638 vol. 3, Nov. 15-19, 1993.
Murino, V.; Regazzoni, C.S., "Visual surveillance by depth from focus," Industrial Electronics, Control and Instrumentation, 1994. IECON '94., 20th International Conference on, vol. 2, No., pp. 998, 1003 vol. 2, Sep. 5-9, 1994.
Murino, V.; Foresti, G.L.; Regazzoni, C.S., "Adaptive camera regulation for investigation of real scenes," Industrial Electronics, IEEE Transactions on, vol. 43, No. 5, pp. 588, 600, Oct. 1996.
Gil, P.; Pomares, J.; Torres, F., "Analysis and Adaptation of Integration Time in PMD Camera for Visual Servoing," Pattern Recognition (ICPR), 2010 20th International Conference on, vol., No., oo.311, Aug. 23-26, 2010.
PCT Search Report and Written Opinion, PCT/US2013/065019, 10 pages, dated Jan. 24, 2014.
PCT Search Report and Written Opinion, PCT/US2014/013618, dated May 14, 2014 11 pages.
Murugappan et al., "Extended Multitouch: Recovering Touch Posture, Handedness, and User Identity using a Depth Camera", Proceedings of the 25th annual ACM symposium on User Interface Software and Technology, copyright ACM 2012, pp. 1-11.
D. Hansen, et al., "In the Eye of the Beholder: A Survey of Models for Eyes and Gaze," IEEE Transactions on Pattern Analysis and Machine Intelligence, vol. 32, Issue 3,: Mar. 2010, pp. 478-500.
PCT Search Report and Written Opinion, PCT/US2014/014440, dated May 22, 2014, 14 pages.
R. Balakrishnan et al., "User Interfaces for Volumetric Displays", Computer, vol. 34, No. 3, pp. 37-45, Mar. 2001.
PCT Search Report and Written Opinion, PCT/US2014/050685, dated Nov. 19, 2014, 13 pages.
Japanese Office Action, JP Application No. 2012-140086, dated Apr. 22, 2015, 4 pages.
English Translation of an Office Action in Chinese Application No. 20120214182.3 dated Nov. 30, 2016, 13 pages.
English Translation of the Third Office Action in Chinese Application No. 20120214182.3 dated Jun. 12, 2017, 11 pages.

\* cited by examiner

SYSTEM AND METHOD FOR CLOSE-RANGE MOVEMENT TRACKING

CROSS-REFERENCE TO RELATED APPLICATIONS

This application claims priority from U.S. Provisional Patent Application No. 61/500,480, filed Jun. 23, 2011, entitled "METHOD AND SYSTEM FOR IDENTIFYING AND TRACKING USER MOVEMENTS FOR INTERACTION WITH AN ELECTRONIC DEVICE", which is incorporated in its entirety herein by reference.

FIELD

The present disclosure relates to methods and devices useful for object tracking, and more particularly, to systems, methods and apparatuses that provide advanced means for tracking the movements of a user's hands and fingers and using the tracked data to control the user's interaction with devices.

BACKGROUND

To a large extent, humans' interactions with electronic devices, such as computers, tablets, and mobile phones, requires physically manipulating controls, pressing buttons, or touching screens. For example, users interact with computers via input devices, such as a keyboard and mouse. While a keyboard and mouse are effective for functions such as entering text and scrolling through documents, they are not effective for many other ways in which a user could interact with an electronic device. A user's hand holding a mouse is constrained to move only along flat two-dimensional (2D) surfaces, and navigating with a mouse through three dimensional virtual spaces is clumsy and non-intuitive. Similarly, the flat interface of a touch screen does not allow a user to convey any notion of depth. These devices restrict the full range of possible hand and finger movements to a limited subset of two dimensional movements that conform to the constraints of the technology.

BRIEF DESCRIPTION OF THE DRAWINGS

Examples of a system and method for providing a user interaction experience, and for automatically defining and identifying movements, are illustrated in the figures. The examples and figures are illustrative rather than limiting.

DETAILED DESCRIPTION

Figure 1:
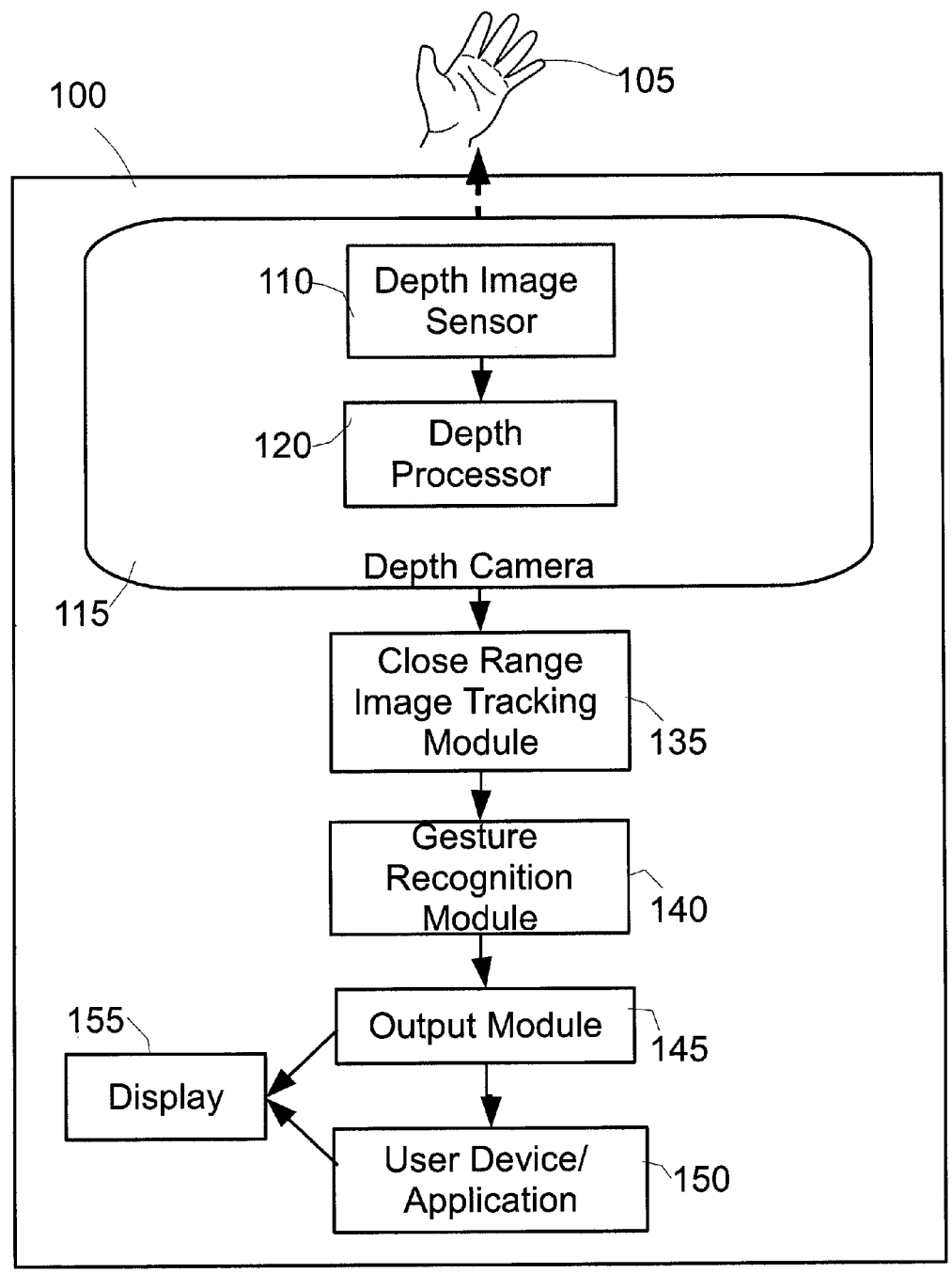
FIG. 1 is a schematic diagram illustrating example components of a close-range object tracking system, according to some embodiments.

A system and method for close range object tracking are described. Close range depth images of a user's hands and fingers or other objects are acquired using a depth sensor. Using depth image data obtained from the depth sensor, movements of the user's hands and fingers or other objects are identified and tracked. The user's hands and fingers or other objects can be shown as a representation on a screen, wherein the representation is shown performing gestures that correspond to the identified movements. The representation of the user's hands and fingers or other objects can interact with other objects displayed on the screen.

Various aspects and examples of the invention will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the technology. Certain terms may even be emphasized below; however, any terminology intended to be interpreted in any restricted manner will be overtly and specifically defined as such in this Detailed Description section.

The tracking of object movements, for example, when a user is interacting with an electronic system or device through gesture control, requires the system to recognize the movements or gesture(s) that a user or object is making. For the purposes of this disclosure, the term 'gesture recognition' is used to refer to a method for identifying specific movements or pose configurations performed by a user. For example, gesture recognition can refer to identifying a swipe on a mouse-pad in a particular direction having a particular speed, a finger tracing a specific shape on a touch screen, or the wave of a hand. The system decides whether a particular gesture was performed, or not, by analyzing data describing the user's interaction with a particular hardware/software interface. That is, there should be some way of detecting or tracking the object that is being used to perform or execute the gesture. In the case of a touch screen, it is the combination of the hardware and software technologies used to detect the user's touch on the screen. In the case of a depth sensor-based system, it is generally the hardware and software combination necessary to identify and track the user's joints and body parts.

In the above examples of system interaction through gesture control, or object tracking in general, a tracking component enables movement recognition and tracking. Gesture recognition can be considered distinct from the process of tracking, in that it generally takes data output from the tracking component, and processes the data to decide whether a pre-defined gesture was performed, or not. Once the gesture is recognized, it can be used to trigger an action, for example, in an application, or in a game on an electronic device. An example where gesture recognition is used occurs when a user waves a hand to turn off the lights in a room.

The input to an object tracking system can be data describing a user's movements that originates from any number of different input devices, such as touch-screens (single-touch or multi-touch), movements of a user as captured with a 2D (also known as a red, green, blue, or "RGB") camera, and movements of a user as captured using a depth sensor. In other applications, the object tracking system can use data from accelerometers and weight scales for movement or gesture recognition.

U.S. patent application Ser. No. 12/817,102, entitled "METHOD AND SYSTEM FOR MODELING SUBJECTS FROM A DEPTH MAP", filed Jun. 16, 2010, describes a method of tracking a player using a depth sensor and identifying and tracking the joints of a user's body. It is hereby incorporated in its entirety in the present disclosure. U.S. patent application Ser. No. 13/441,271, entitled "System and Method for Enhanced Object Tracking", filed Apr. 6, 2012, describes a method of identifying and tracking a user's body part(s) using a combination of depth data and amplitude data from a time-of-flight (TOF) camera, and is hereby incorporated in its entirety in the present disclosure.

Robust movement or gesture recognition can be quite difficult to implement. In particular, the system should be able to interpret the user's intentions accurately, adjust for differences in movements between different users, and determine the context in which the movements are applicable.

A flexible, natural, and intuitive way of interacting with systems or devices would be for the system to interpret the movements of a user's hands and fingers in a three-dimensional space in front of a display screen, thus permitting a full range of possible configurations and movements of human hands and fingers to be supported. Essentially, the familiar two dimensional touch screen is extended into a freer, less constrained and more intuitive, three-dimensional interaction space that supports a far more expressive range of possible gestures and interactions.

To enable this more natural, intuitive type of interaction, the system should be able to fully identify the configurations and movements of a user's hands and fingers. Conventional cameras, such as, RGB cameras, are insufficient for this purpose, as the data generated by these cameras is difficult to interpret accurately and robustly. In particular, the object in the images is difficult to distinguish from the background, the data is sensitive to lighting conditions, and occlusions occur between different objects in the images. In contrast, using depth sensors to track hands and fingers and other objects at close range can generate data that supports highly accurate, robust tracking of the user's hands and fingers and objects to enable this new, intuitive, and effective way to interact with systems or devices.

A depth sensor is defined as a sensor that obtains depth data for each pixel of a captured image, where depth refers to the distance between an object and the sensor itself. There are several different technologies used by depth sensors for this purpose. Among these are sensors that rely on time-of-flight (including scanning TOF or array TOF), structured light, laser speckle pattern technology, stereoscopic cameras, and active stereoscopic cameras. In each case, these cameras generate an image with a fixed resolution of pixels, where a value, typically an integer value, is associated with each pixel, and these values correspond to the distance of the object projected onto that region of the image, from the sensor. In addition to depth data, the sensors may also generate color data, in the same way that conventional color cameras do, and this data can be combined with the depth data for use in processing.

The data generated by depth sensors has several advantages over that generated by conventional, "2D" cameras. The depth sensor data greatly simplifies the problem of segmenting the background from the foreground, is generally robust to changes in lighting conditions, and can be used effectively to interpret occlusions. Using depth sensors, it is possible to identify and track both the user's hands and his fingers in real-time. Knowledge of the position data of a user's hands and fingers can, in turn, be used to enable a virtual "3D" touch screen, in which interaction with devices is natural and intuitive. The movements of the hands and fingers can power user interaction with various different systems, apparatuses, and/or electronic devices, for example, computers, tablets, mobile phones, handheld gaming consoles, and the dashboard controls of an automobile. Furthermore, the applications and interactions enabled by this interface include productivity tools and games, as well as entertainment system controls (such as a media center), augmented reality, and many other forms of communication between humans and electronic devices.

The present disclosure describes the usage of depth sensor images to more accurately identify and track objects at close range and reliably process users' movements and gestures. The term "close range" as used herein, generally refers to the substantially personal space or area in which a user interacts with a substantially personal device, for example, from the physical interfacing with a system or device. Thus, in one embodiment, close-range depth images are typically, although not necessarily, acquired within the range of 30 cm to 50 cm. In one embodiment, close-range depth images may be acquired within the range of 0 to 3.0 meters. In some embodiments, depth images may be acquired at a distance greater than 3.0 meters, depending on the environment, screen size, device size, depth sensor resolution, depth sensor accuracy, etc.

Reference is now made to FIG. 1, which is a schematic illustration of elements of a close-range object tracking system 100, and the workflow between these elements, in accordance with some embodiments. The close-range object tracking system 100 can include, for example, a depth camera 115, a close range image tracking module 135, a gesture recognition module 140, an output module 145, and a software application 150. Additional or fewer components or modules can be included in the system 100 and each illustrated component. For example, the depth camera 115 can include a depth image sensor 110 that captures depth data and a depth processor 120 that processes the depth data to generate a depth map. The processing steps performed by the depth processor 120 are dependent upon the particular technique used by the depth image sensor 110, for example, structured light and TOF techniques. The depth camera 115 can also include other components (not shown), such as one or more lenses, light sources, and electronic controllers.

As used herein, a "module" includes a general purpose, dedicated or shared processor and, typically, firmware or software modules that are executed by the processor. Depending upon implementation-specific or other considerations, the module can be centralized or its functionality distributed. The module can include general or special purpose hardware, firmware, or software embodied in a computer readable (storage) medium for execution by the processor. As used herein, a computer-readable medium or computer-readable storage medium includes hardware (e.g. registers, random access memory (RAM), nonvolatile (NV) storage.

As can be seen in FIG. 1, system 100 may track an object 105, such as a user's hand, head, foot, arm, face, or any other object, where the object is typically located within close range to image sensor 110. System 100 may include a depth camera 115 which senses objects at close-range. Depth camera 115 supports an image tracking module 135 that uses images generated by the depth camera 115 to identify objects and detect object movements at close range, and even to detect fine motor movements. For example, depth camera 115 may be adapted to provide sufficient pixel resolution and accurate depth data values in order to detect fine, nuanced movements of fingers, lips and other facial elements, toes, etc.

System 100 may further include a close range image tracking module 135 for executing object tracking. In some embodiments, the tracking module 135 can process depth data from the depth camera 115, for example, by applying an appropriate algorithm to the depth image data, to enable system 100 to utilize close-range depth data. Tracking module 135 may be enabled to process depth image data, in accordance with close range optical settings and requirements. Tracking module 135 may enable processing, calculating, identification and/or determination of object presence, movement, distance, speed, etc., for one or more objects, possibly simultaneously. Close range image tracking module 135 may, for example, execute software code or algorithms for close range tracking, for example, to enable detection and/or tracking of facial movements, foot movements, head movements, arm movements, or other suitable object movements at close range. In one example, the tracking module 135 can track the movements of a human, and the output of tracking module 135 can be a representation of the human skeleton.

Similarly, if only a user's hands and fingers are being tracked, the output of tracking module 135 can be a representation of the skeleton of the user's hand. The hand skeleton representation can include the positions of the joints of the skeleton, and may also include the rotations of the joints, relative to a center point. It may also include a subset of these points. Furthermore, the output of module 135 can include other features, such as the center of mass of an object being tracked, or any other useful data that can be obtained by processing the data provided by the depth camera 115.

Furthermore, the close range image tracking module 135, upon receiving data from depth camera 115, may be configured to identify shapes and/or functions of specific objects, such as the different fingers on each hand to identify, for example, the movements of each of the fingers, which particular finger or fingers are being moved, and an overall movement(s) that the individual finger movements correspond to.

In some embodiments, the close range image tracking module 135 may be configured to identify and determine movement intensity of objects, in accordance with speed of movement, strides of movement etc., thereby enabling a force aspect of a movement to be detected and utilized.

In some embodiments, the close range image tracking module 135 may be configured to track the movements of multiple fingers, so that gestures made with different fingers or combinations of fingers can be recognized.

In some embodiments, code or algorithms for close range tracking may be used, for example, to detect and/or track facial movements, foot movements, head movements, arm movements, or other suitable object movements.

System 100 may further include a movement or gesture recognition module 140 to classify sensed data, thereby aiding the recognition and determination of object movement. The gesture recognition model 140 may, for example, generate an output that can be used to determine whether an object is moving, signaling, gesticulating, etc., as well as to identify which specific gestures were performed.

System 100 may further include an output module 145 for processing the processed tracking data, such as gesturing data, to enable user commands or actions to be satisfactorily output to external platforms, consoles, etc.

System 100 may further include a software application 150, which accepts the output from the output module 145 and uses it within the context of a software application. Software application 150 may be a game, or a program controlling the user's interaction with a device, or it may otherwise make use of the processed movement data sensed by the depth camera 115.

In one embodiment, the system 100 can further include a display 155. The display provides visual feedback to the user. The visual feedback can include a representation of the user's gestures where information pertaining to the representation is received from the output module 145. The visual feedback can also include an interaction of the representation of the user's gestures with one or more virtual objects, wherein information pertaining to the interaction is received from the software application 150.

Figure 2:
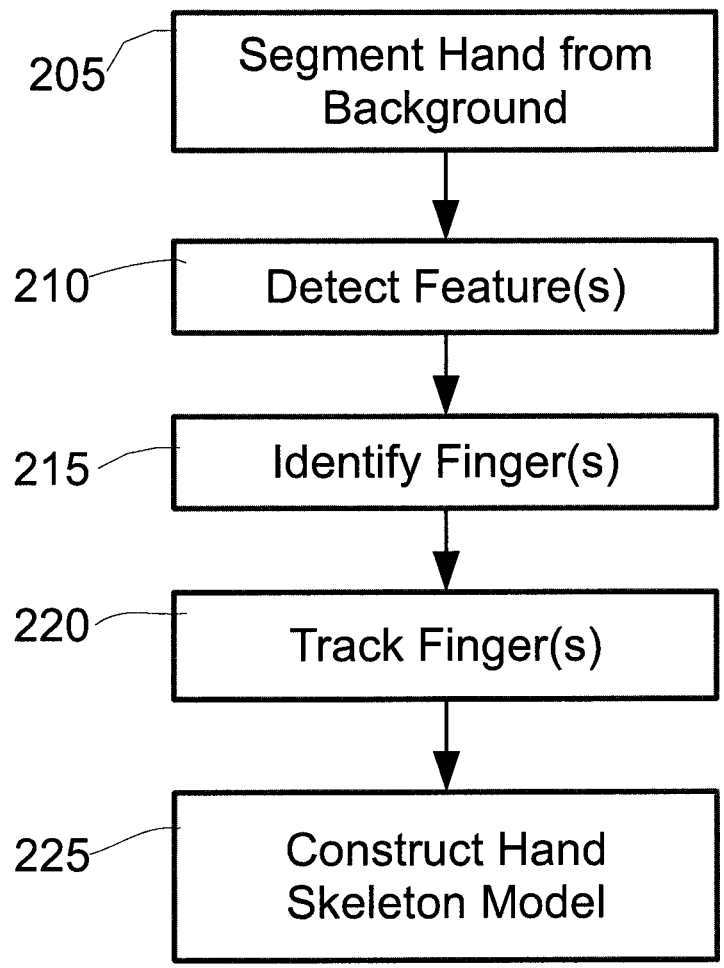
FIG. 2 is a work flow diagram illustrating an example of a movement tracking process by a close-range object tracking system, according to some embodiments.

Reference is now made to FIG. 2, which describes an example process of tracking a user's hand(s) and finger(s), using tracking module 135 on data generated by depth camera 115. As can be seen in FIG. 2, at block 205, the user's hand is identified from the depth image data obtained from the depth camera 115. The hand is segmented from the background by removing noise and unwanted background data using segmentation and/or classification algorithms.

At block 210, features are detected in the depth image data and associated amplitude data and/or associated RGB images. These features may be, for example, the tips of the fingers, the points where the bases of the fingers meet the palm, and any other image data that is detectible. At block 215, the features identified at block 210 are used to identify the individual fingers in the image data. At block 220, the fingers are tracked based on their positions in previous frames, to filter out possible false-positive features that were detected, and fill in data that may be missing from the depth image data, such as occluded points.

At block 225, the three dimensional positions of the tracked fingers are obtained from the depth image data and used to construct a skeleton model of the user's hand and fingers. In some embodiments, a kinematics model can be used to constrain the relative locations of the subject's joint. The kinematic model can also be used to compute the positions of joints that are not visible to the camera, either because the joints are occluded, or because the joints are outside the field-of-view of the camera.

Figure 3A:
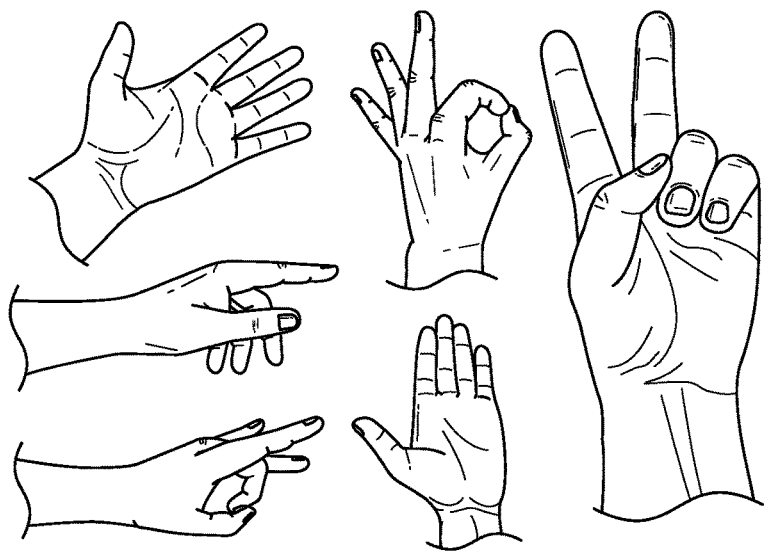
FIGS. 3A-3E show graphic illustrations of examples of hand gestures that may be tracked, according to some embodiments.
Figure 3B:
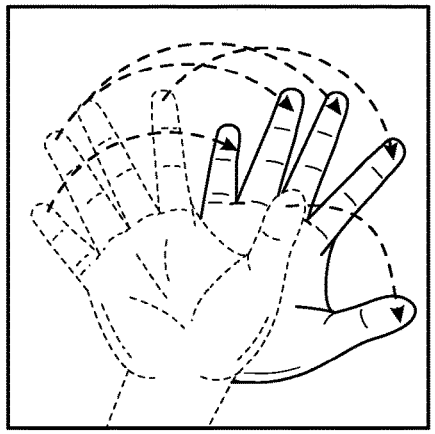
Figure 3C:
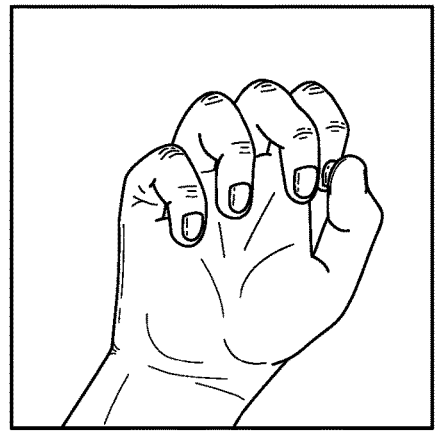
Figure 3D:
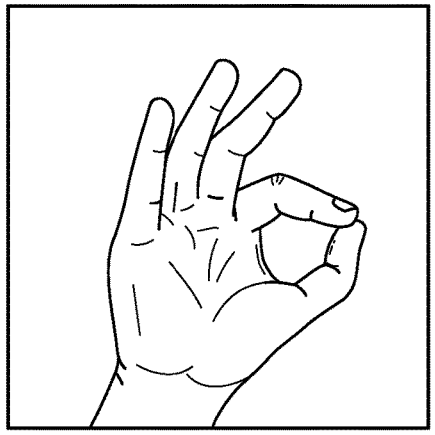
Figure 3E:
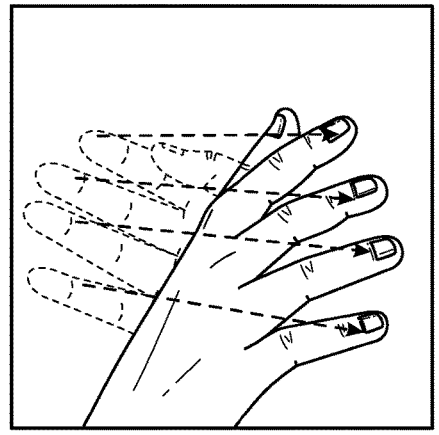

Reference is now made to FIGS. 3A-3E, which show a series of hand gestures, as examples of fine motor movements that may be detected, tracked, recognized and executed. FIGS. 3A, 3C, and 3D show static hand signal gestures that do not have a movement component, while FIGS. 3B and 3E show dynamic hand gestures. FIGS. 3B and 3E include superimposed arrows showing the movements of the fingers that comprise a meaningful and recognizable signal or gesture. Of course, other gestures or signals may be detected and tracked, from other parts of a user's body or from other objects. In further examples, gestures or signals from multiple objects or user movements, for example, a movement of two or more fingers simultaneously, may be detected, tracked, recognized and executed.

Embodiments of the present disclosure may include but are not limited to the following forms of interaction:

In one example, each of a user's fingers can be a cursor on a display screen. In this way, the user can interact with multiple icons (up to ten, using both hands), simultaneously. The term "cursor" as used herein may refer to other signals, symbols, indicators etc., such as a movable, sometimes blinking, symbol that indicates the position on a CRT or other type of display where the next character entered from the keyboard will appear, or where user action is needed.

In a further example, a virtual hot field can be defined in front of a screen. The user can select objects on a display screen by moving his/her fingers and/or hand(s) in the hot field, for example, simulating a movement for clicking a mouse button. The virtual hot field provides functionality similar to that of a two dimensional touch screen, although more expansive, since the three dimensional positions of the fingers/hands can also be used.

Figure 4:
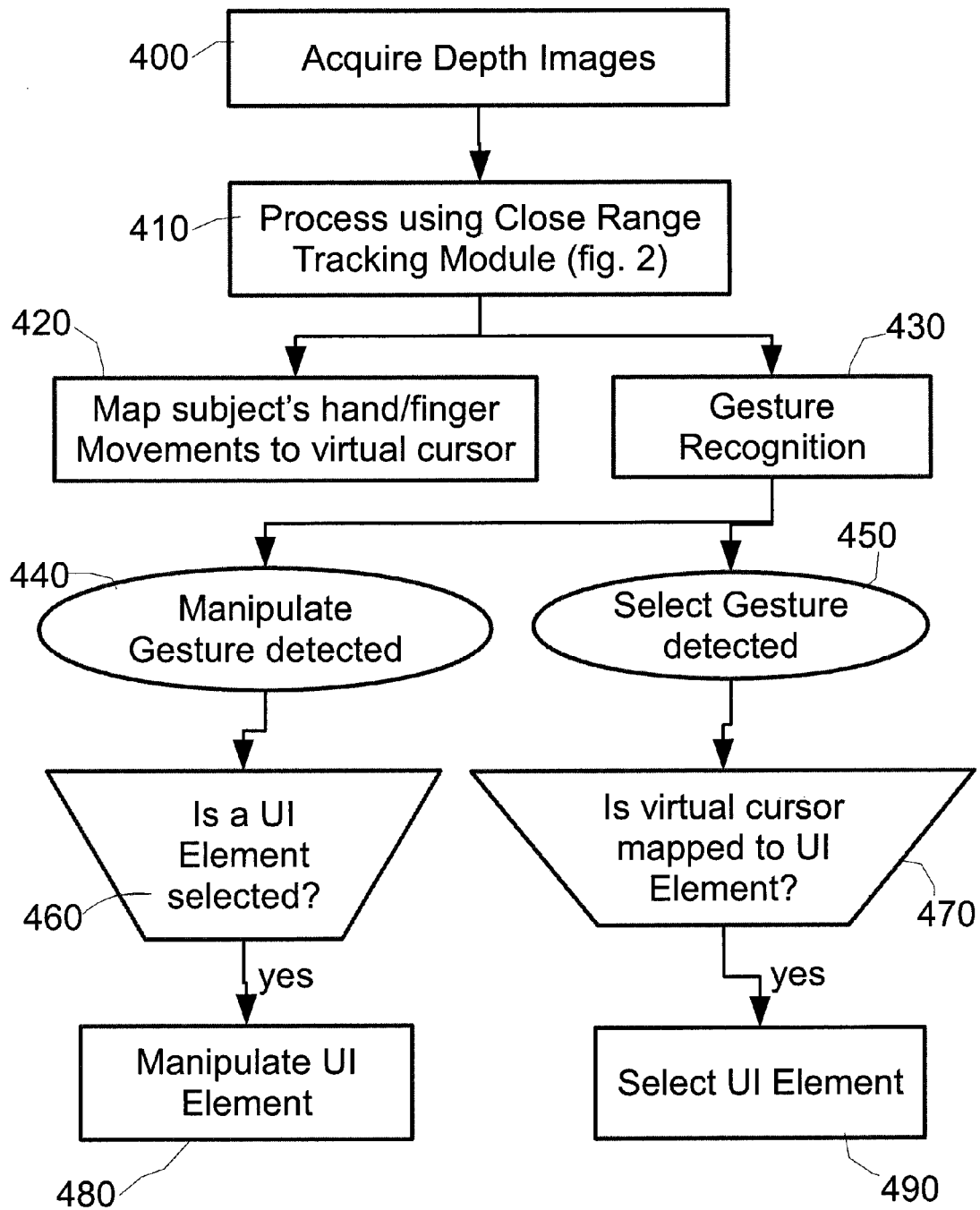
FIG. 4 is a work flow diagram illustrating an example of a movement tracking process by a close-range object tracking system, according to some embodiments.

Reference is now made to FIG. 4, which illustrates an example of a user interface (UI) framework, based on close-range tracking enabling technology. The gesture recognition component may include elements described in U.S. Pat. No. 7,970,176, entitled "Method and System for Gesture Classification", and application Ser. No. 12/707,340, entitled, "Method and System for Gesture Recognition", which are fully incorporated herein by reference.

At stage 400, depth images are acquired from a depth camera. At stage 410, a tracking module 135 performs the functions described in FIG. 2 using the obtained depth images. The joint position data generated by the tracking module 135 are then processed in parallel, as described below. At stage 420, the joint position data is used to map or project the subject's hand/finger movements to a virtual cursor. Optionally, a cursor or command tool may be controlled by one or more of the subject's fingers. Information may be provided on a display screen to provide feedback to the subject. The virtual cursor can be a simple graphical element, such as an arrow, or a representation of a hand. It may also simply highlight or identify a UI element (without the explicit graphical representation of the cursor on the screen), such as by changing the color of the UI element, or projecting a glow behind it. Different parts of the subject's hand(s) can be used to move the virtual cursor.

In some embodiments, the virtual cursor may be mapped to the subject's hand(s) or one or more finger(s). For example, movements of the index (pointer) finger may map or project directly onto movements of the virtual cursor. In another embodiment, the UI elements are stacked in depth, one on top of another. The virtual cursor can be allowed to move in three dimensions, so that the virtual cursor can move among UI elements at different levels of depth. In another embodiment, there are multiple virtual cursors, each corresponding to one of the subject's fingertips. In another embodiment, movements of the hand(s) away from the screen can impose a zoom effect. Alternatively, the distance between the tips of two fingers, say the index finger and the thumb, can also be used to indicate the level of zoom in the display.

At stage 430, the position data of the joints is used to detect gestures that may be performed by the subject. There are two categories of gestures that trigger events: selection gestures and manipulation gestures. Selection gestures indicate that a specific UI element should be selected. In some embodiments, a selection gesture is a grabbing movement with the hand, where the fingers move towards the center of the palm, as if the subject is picking up the UI element. In another embodiment, a selection gesture is performed by moving a finger or a hand in a circle, so that the virtual cursor encircles the UI element that the subject wants to select. Of course, other gestures may be used. At stage 450, the system evaluates whether a selection gesture was detected at stage 430, and, if so, at stage 470 the system determines whether a virtual cursor is currently mapped to one or more UI elements. In the case where a virtual cursor has been mapped to a UI element(s), the UI element(s) may be selected at stage 490.

In addition to selection gestures, another category of gestures, manipulation gestures, are defined. Manipulation gestures may be used to manipulate a UI element in some way. In some embodiments, a manipulation gesture is performed by the subject rotating his/her hand, which in turn, rotates the UI element that has been selected, so as to display additional information on the screen. For example, if the UI element is a directory of files, rotating the directory enables the subject to see all of the files contained in the directory. Additional examples of manipulation gestures can include turning the UI element upside down to empty its contents, for example, onto a virtual desktop; shaking the UI element to reorder its contents, or have some other effect; tipping the UI element so the subject can "look inside"; or squeezing the UI element, which may have the effect, for example, of minimizing the UI element. In another embodiment, a swipe gesture can move the selected UI element to the recycle bin.

At stage 440 the system evaluates whether a manipulation gesture has been detected. If a manipulation gesture was detected, subsequently, at stage 460, the system checks whether there is a UI element that has been selected. If a UI element has been selected, it may then be manipulated at stage 480, according to the particular defined behavior of the performed gesture, and the context of the system. In some embodiments, one or more respective cursors identified with the respective fingertips may be managed, to enable navigation, command entry or other manipulation of screen icons, objects or data, by one or more fingers.

According to some embodiments, conventional two dimensional icons can be rotated to display an additional dimension to convey additional related information to the user. For example, a window icon may display a list of files in a directory. When the user rotates his/her hand, the window icon is rotated, and a third dimension is displayed that shows the sizes of each file in the directory.

In some embodiments, objects on a display screen can be selected by moving a hand over the object and then bringing the fingers closer to the palm of the hand, to "grasp" the object. This is an example of a selection gesture.

In some embodiments, after being selected, objects can be placed in the recycling bin with a "swipe" gesture of the hand, moving the hand quickly from one position to another. This is an example of a manipulation gesture.

In some embodiments, the distance from the screen can be used in conjunction with the two dimensional projection of the fingers' or hands' locations on the screen. For example, the user can indicate an icon or group of icons on the display screen by moving his finger to draw a circle around the icon(s). Then, as the user moves his hand/finger away from the screen, the size of the circle grows or shrinks correspondingly, changing the area on the screen inside the circle that is selected, and thus changing the number of icons that are selected.

In some embodiments, the distance from the screen can be used as a scaling factor. For example, the size of a given object is defined by the distance between the user's thumb and forefinger. However, the distance from the screen can additionally be used as a scaling factor that multiplies the distance between the thumb and forefinger.

In some embodiments, icons can be stacked in front of one another, and the distance of the user's hand to the screen can be used to select icons. As the user moves his hand closer to the display screen, objects further back in the stack are selected, and as the user's hand moves away from the display screen, objects toward the top of the stack are selected.

In some embodiments, multiple objects on the screen may be selected by the respective fingertips, and may be manipulated in accordance with the fingers' movements. In some embodiments, the distance of the hand or fingers from the screen may affect the size of the screen image. For example, by moving the tracked hand backwards, the screen may zoom out to enable a larger view of the objects being managed. In some embodiments, screen objects may be overlaid, representing multiple levels of objects to be manipulated. In such cases, depth images of the hand and/or fingers or other objects may be used to manipulate objects at different depths, in accordance with the distance of the hand(s), finger(s), or object(s) from the screen.

Figure 5:
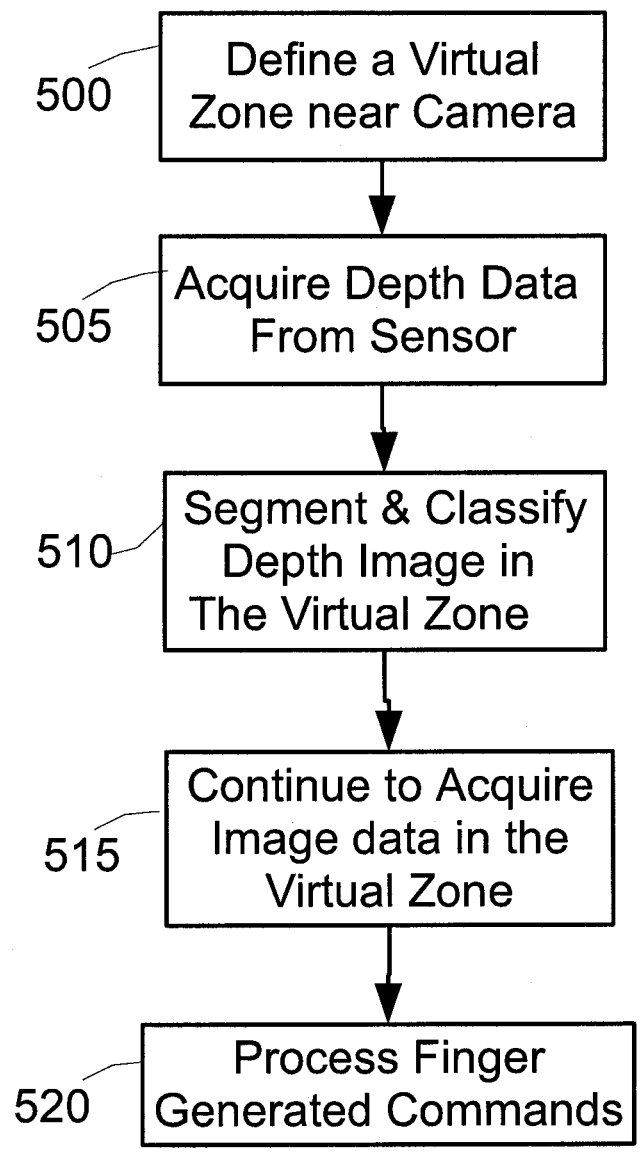
FIG. 5 is a work flow diagram illustrating a further example of a movement tracking process by a close-range object tracking system, according to some embodiments.

FIG. 5 describes an example usage of a virtual zone as a user command tool, according to some embodiments. As can be seen in FIG. 5, at block 500, a virtual zone is defined at a selected proximity to a depth camera. The virtual zone may be defined as a three-dimensional space at a particular proximity to a depth camera in which close range movements may be tracked, for example, to enable user typing, clicking, screen navigation, etc., using one or more of the user's body parts or another object.

At block 505, depth data is processed using a tracking module, for example as is described in FIG. 4 above. At block 510 the system determines whether the user's hand/finger/commanding object is in the virtual zone. At block 515, if the user's hand/finger etc. is within the virtual zone, the system performs or executes the gesture or action indicated by the user. If the user's hand/finger etc. is not within the virtual zone, the system returns to block 505 to continue to process further depth data using the tracking module, until the system has determined that the user's hand/finger etc. is within the virtual zone.

In accordance with further embodiments, the close range movement tracking system described herein may enable virtual playing of musical instruments through the movements of fingers and/or other objects. In some examples, the positions of the hands may determine selection of a particular instrument. In some embodiments, the depth images of a user's hands and fingers may be acquired with a depth camera. The data may be processed to enable identification of the positions of the user's hands from the depth images to determine a selection of an instrument. The depth images may then be used to enable tracking the movements of the user's fingers from the depth images, where the movements of the user's fingers virtually operate the instrument. Further, the operation of the virtual instrument may be simulated based on the tracked movements. In some examples, the simulation of operation of the instrument includes providing sounds corresponding to notes played by the user's finger movements on the instrument. In still further examples, the simulation of operation of the instrument further includes providing a visual display of operation of the instrument on the screen.

In still further examples, Sign Language gestures (e.g., American Sign Language or other gesture-based languages) can be identified by the system. In further examples, a gesture based language may be identified, by acquiring depth images of a user's hands and fingers and/or other body parts with a depth camera, identifying a gesture made by the users hands and fingers and/or other body parts from the depth images as a pre-defined gesture of a gesture-based language, and providing a translation of the pre-identified gesture as an output. In some examples, the output may be text and/or audio, etc.

In still further examples, users can also communicate with a system or device by forming pre-defined gestures, such as holding one or more fingers up, "grasping" (moving the fingers closer towards the palm of the hand), waving a hand, snapping fingers, etc. Any of these gestures can be mapped to a particular function of the system. For example, snapping the fingers can place a computer system in "hibernate" mode. The disclosures of described in U.S. Pat. No. 7,970,176, entitled "METHOD AND SYSTEM FOR GESTURE CLASSIFICATION" and U.S. application Ser. No. 12/707,340, entitled "METHOD AND SYSTEM FOR GESTURE RECOGNITION", provide descriptions for defining such gestures, and are fully incorporated herein by reference.

In some embodiments, a user's head may be tracked, in order to change the perspective of icons displayed on a two dimensional screen. That is, as the user moves to the side, his view of the screen shifts accordingly.

In some examples, gestures can be defined which cause consistent, system-wide behavior. For example, any icon/folder can have defined behaviors/characteristics. The following is an example of a set of gestures or signals that can be defined to apply to all folder icons.

For a 'spill' gesture, the user selects an item and rotates it slightly, so its contents spill out from the top. For a 'look inside' gesture, the user selects an item and rotates it so he can view the contents inside the item. For a 'shake' gesture, the user selects an object and makes a shaking movement, and a pre-determined action results, such as the alphabetical re-ordering of the contents of the item. For a 'look behind' gesture, the user selects an item and rotates it in order to see the "back" of the item, where additional information is available. For example, when a folder containing picture files is rotated, text captions of the pictures are displayed. For a 'squeeze' gesture, the user selects an item and squeezes it to minimize the item, or make it disappear from the desktop. In further examples, gestures or movements by multiple objects, such as fingers, arms, eyes, etc., may be determined to indicate additional gestures or signals. In still further examples, gestures or movements by one or more objects with differing styles, speeds, intensities, etc. may be determined to indicate additional gestures or signals. Of course, further gestures or signals or combinations of gestures or signals may be used.

In some embodiments, even if the user's hand is mapped to a virtual representation with one-to-one movements, there are different ways to represent the user's hand in this virtual space (e.g., on the desktop). In one example, a model of a hand may be tracked, wherein the virtual icon resembles the user's hand. For example, it remains in the same configuration that the user's hand is in. In a further example, a medium level of abstraction of the user's hand may be used. For example, each dot displayed in a virtual space may correspond to one of the user's fingertips. In an additional example, a higher level of abstraction of the user's hand may be used, wherein the hand appears as, and functions as, an animated object.

In accordance with some embodiments, physics/forces-oriented interactions may be tracked and used. In these examples, gestures may not interact directly with the items. Rather, the gestures may generate forces that interact with the items. For example, instead of defining a "spin" gesture—a specific gesture which makes an object begin spinning—it may be determined that any gesture that can generate this type of physical force accomplishes the task.

Spinning an object can effectively be performed in one of several ways, such as waving the hand quickly to generate movement with reasonable velocity, slapping the corner of an item, or gently moving the hand across the item. Of course, further gestures or signals or combinations of gestures or signals may be used.

According to some embodiments, different fingers may have different functions. For example, an object may be selected by grabbing it with the user's hand, such that: the index finger opens it; the middle finger erases it; the ring finger maximizes it etc. Of course, further gestures or signals or combinations of gestures or signals may be used.

Unless the context clearly requires otherwise, throughout the description and the claims, the words "comprise", "comprising", and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or sub-combinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts included in such references to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms. For example, while only one aspect of the invention is recited as a means-plus-function claim under 35 U.S.C. §112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for.") Accordingly, the applicant reserves the right to add additional claims after filing the application to pursue such additional claim forms for other aspects of the invention.

We claim:

1. A method for operating a user interface comprising:
   acquiring close range depth images of a user's hand with a depth sensor;
   constructing a skeletal model of the user's hand based on the acquired depth images, the skeletal model including one or more designated zones of joints;
   identifying from the acquired depth images movement within the one or more designated zones of joints in the skeletal model of the user's hand, the movement including movement of fingers of the user's hand within the one or more designated zones of joints based on the constructed skeletal model of the user's hand;
   tracking the movement of fingers of the user's hand within the one or more designated zones of joints in the skeletal model of the user's hand using a 3D joint data corresponding to a position of a joint within the one or more designated zones of joints in the skeletal mode of the user's hand;
   mapping the 3D joint data corresponding to the position of the joint in the constructed skeletal model to project the user's hand on a screen as a first object performing a gesture corresponding to the movement of fingers of the user's hand within the designated zones of joints in the skeletal model of the user's hand; and
   wherein the fingers on the user's hand are represented as individual virtual cursor components of the first object, each individual virtual cursor component configured to:
   simultaneously interact with one or more separate objects on the screen, and have a different function for interacting with a same object of the one or more separate objects on the screen,
   including:
   an index finger on the user's hand having a first function to open the same object,
   a middle finger on the user's hand having a second function to erase the same object, and
   a ring finger on the user's hand having a third function to maximize the same object.

2. The method of claim 1, wherein performing the gesture corresponding to the movement of fingers of the user's hand within the designated zones of joints in the skeletal model of the user's hand generates a force that interacts with the one or more of the separate objects on the screen.

3. The method of claim 1, wherein identified movement of fingers of the user's hand within the designated zones of joints in the skeletal model of the user's hand corresponds to a selection gesture, wherein the first object on the screen selects a second object on the screen.

4. The method of claim 1, wherein identified movement of fingers of the user's hand within the designated zones of joints in the skeletal model of the user's hand corresponds to a manipulation gesture, wherein a second object on the screen is manipulated according to a predefined action associated with the manipulation gesture.

5. The method of claim 1, further comprising:
determining a distance of the user's hand from the screen;
zooming the screen in and out based on changes in the distance.

6. The method of claim 5, further comprising moving a cursor on the screen to indicate a selected object from a stack of objects on the screen, wherein the cursor is moved based upon the distance of the user's hand from the screen, wherein moving the cursor comprises moving the cursor towards a bottom of the stack of objects as the user's hand moves closer to the screen and moving the cursor towards a top of the stack of objects as the user's hand moves farther from the screen.

7. The method of claim 1, further comprising scaling a size of the first object based on the distance of the user's hand from the screen.

8. A system comprising:
a depth sensor to acquire at close range depth images of a user's hand;
a processor to execute:
a tracking module to construct a skeletal model of the user's hand based on the acquired depth images, the skeletal model including one or more designated zones of joints, identify from the acquired depth images movement within the one or more designated zones of joints in the skeletal model of the user's hand, the movement including movement of fingers of the user's hand within the one or more designated zones of joints based on the constructed skeletal model of the user's hand, and track the movement of fingers of the user's hand within the one or more designated zones of joints in the skeletal model of the user's hand using a 3D joint data corresponding to a position of a joint within the one or more designated zones of joints in the skeletal mode of the user's hand;
an output module
to map the 3D joint data corresponding to the position of the joint in the constructed skeletal model to project the user's hand on a screen as a first object performing a gesture corresponding to the movement of fingers of the user's hand within the designated zones of joints in the skeletal model of the user's hand, wherein the fingers on the user's hand are represented as individual virtual cursor components of the first object, each individual virtual cursor component configured to:
simultaneously interact with one or more separate objects on the screen, and have a different function for interacting with a same object of the one or more separate objects on the screen,
including:
an index finger on the user's hand having a first function to open the same object,
a middle finger on the user's hand having a second function to erase the same object, and
a ring finger on the user's hand having a third function to maximize the same object.

9. The system of claim 8, wherein performing the gesture corresponding to the movement of fingers of the user's hand within the designated zones of joints in the skeletal model of the user's hand generates a force that interacts with the one or more of the separate objects on the screen.

10. The system of claim 8, wherein identified movement of fingers of the user's hand within the designated zones of joints in the skeletal model of the user's hand corresponds to a selection gesture, wherein the first object on the screen selects a second object on the screen.

11. The system of claim 8, wherein identified movement of the fingers of user's hand within the designated zones of joints in the skeletal model of the user's hand corresponds to a manipulation gesture, wherein a second object on the screen is manipulated according to a predefined action associated with the manipulation gesture.

12. The system of claim 8, wherein the output module determines a distance of the user's hand from the screen and zooms the screen in and out based on changes in the distance.

13. The system of claim 12, wherein the output module moves a cursor on the screen to indicate a selected object from a stack of objects on the screen, wherein the cursor is moved based upon the distance of the user's hand from the screen, wherein moving the cursor comprises moving the cursor towards a bottom of the stack of objects as the user's hand moves closer to the screen and moving the cursor towards a top of the stack of objects as the user's hand moves farther from the screen.

14. The system of claim 8, wherein the output module scales a size of the first object based on the distance of the user's hand from the screen.

15. A non-transitory computer readable medium comprising instructions, which when executed by a processor perform operations, comprising:
acquiring close range depth images of a user's hand with a depth sensor;
constructing a skeletal model of the user's hand based on the acquired depth images, the skeletal model including one or more designated zones of joints;
identifying from the acquired depth images movement within the one or more designated zones of joints in the skeletal model of the user's hand, the movement including movement of fingers of the user's hand within the one or more designated zones of joints based on the constructed skeletal model of the user's hand;
tracking the movement of fingers of the user's hand within the one or more designated zones of joints in the skeletal model of the user's hand using a 3D joint data corresponding to a position of a joint within the one or more designated zones of joints in the skeletal mode of the user's hand;
mapping the 3D joint data corresponding to the position of the joint in the constructed skeletal model to project the user's hand on a screen as a first object performing a gesture corresponding to the movement of fingers of the user's hand within the designated zones of joints in the skeletal model of the user's hand; and
wherein the fingers on the user's hand are represented as individual virtual cursor components of the first object, each individual virtual cursor component configured to:

simultaneously interact with one or more separate objects on the screen, and have a different function for interacting with a same object of the one or more separate objects on the screen, including:

an index finger on the user's hand having a first function to open the same object, a middle finger on the user's hand having a second function to erase the same object, and a ring finger on the user's hand having a third function to maximize the same object.

16. The computer readable medium of claim 15, wherein performing the gesture corresponding to the movement of fingers of the user's hand within the designated zones of joints in the skeletal model of the user's hand generates a force that interacts with the one or more of the separate objects on the screen.

17. The computer readable medium of claim 16, wherein identified movement of fingers of the user's hand within the designated zones of joints in the skeletal model of the user's hand corresponds to a selection gesture, wherein the first object on the screen selects a second object on the screen.

* * * * *